June 9, 1953  L. E. BLANCHETT ET AL  2,641,737
DYNAMOELECTRIC MACHINE
Filed July 9, 1948  2 Sheets-Sheet 1

LUTHER E. BLANCHETT,
CHARLES L. STEFFEN,
INVENTORS,

BY John R. Thierry

ATTORNEY.

LUTHER E. BLANCHETT,
CHARLES L. STEFFEN,
INVENTORS,

BY John A. Thierry

ATTORNEY.

Patented June 9, 1953

2,641,737

UNITED STATES PATENT OFFICE 2,641,737

DYNAMOELECTRIC MACHINE

Luther E. Blanchett, South Milwaukee, and Charles L. Steffen, Milwaukee, Wis., assignors to Bucyrus-Erie Company, South Milwaukee, Wis., a corporation of Delaware Application July 9, 1948, Serial No. 37,743

4 Claims. (Cl. 322—19)

Our invention relates to new and useful improvements in direct-current commutator-type dynamoelectric machines, more particularly to machines of this type, popularly known as "amplidynes," in which a low-inductance primary armature reaction and a compensated secondary armature reaction are used to provide a controllable voltage-current characteristic having a high rate of response and a high amplification ratio.

Dynamoelectric machines of this general type are shown and described in U. S. Patent No. 2,227,992, granted January 7, 1941, to E. F. W. Alexanderson et al., to which reference is hereby made, inasmuch as this present invention represents an improvement thereon.

An amplidyne may be used to control other electrical apparatus, as, for example, to excite the separate field winding of a generator. When the generator is operating under normal steady loads, the generator voltage and current (corresponding respectively to speed and torque of the mechanical load on the motor driven by the generator) relation may be represented by a "static-load" characteristic curve, the voltage decreasing as the current increases. Where the generator is suddenly stalled during operation (as where the mechanical load is suddenly increased), it has been found that the generator voltage will not fall off according to the static-load characteristic curve as the current (proportional to torque demand) increases. This "overshooting" phenomenon is due to the inductive "inertia" in the generator circuit, and results in excessive mechanical and electrical strain in the machinery and the electrical equipment.

Accordingly, it is a principal object of our invention to provide electrical means whereby "overshooting" is eliminated or greatly reduced in an amplidyne-controlled generator.

A further object is to utilize said means to further increase the quick response characteristic of the amplidyne control.

In addition to our principal objects above stated, we have worked out a number of novel and useful details, which will be readily evident as the description progresses.

Our invention consists in the novel parts and in the combination and arrangement thereof, which are defined in the appended claims, and of which two embodiments are exemplified in the accompanying drawings, which are hereinafter particularly described and explained.

Throughout the description, the same reference number is applied to the same member or to similar members.

Figure 1:
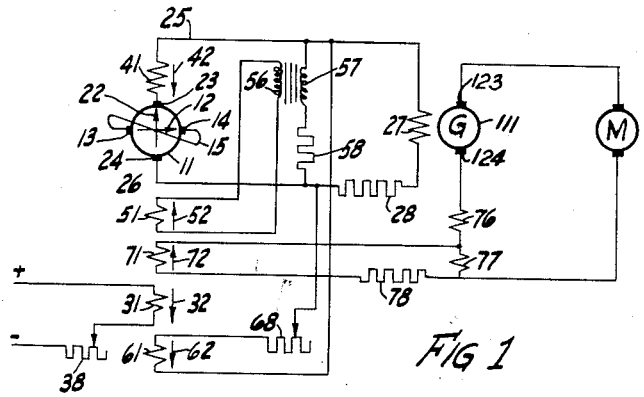
Figure 1 is an electrical diagram illustrating schematically an electrical system embodying the first embodiment of our invention.
Figure 2:
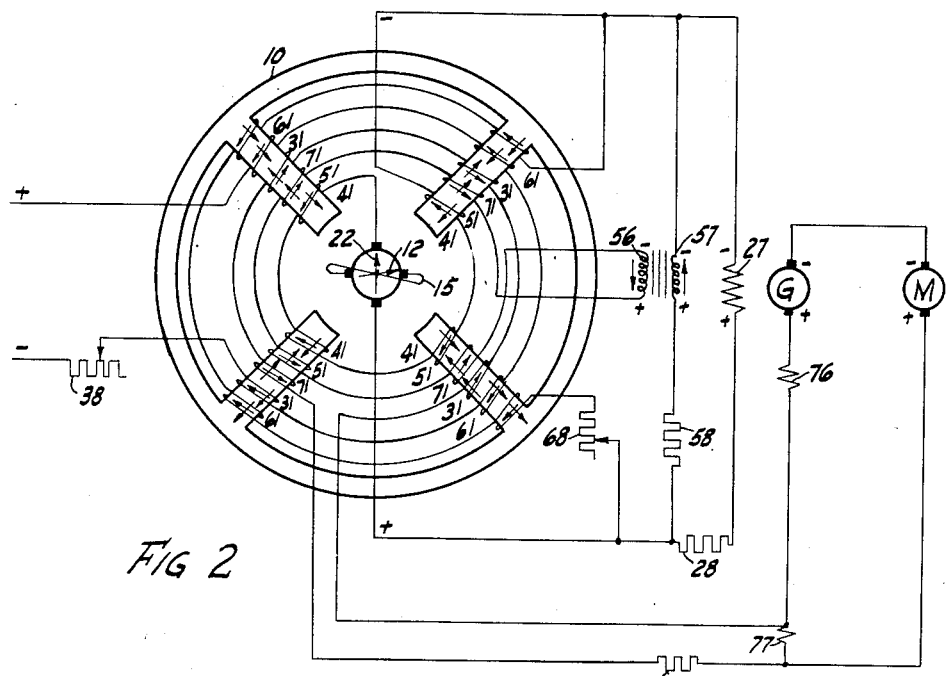
Figure 2 is a schematic diagram of the system shown in Figure 1, showing the arrangement of field excitation windings on the amplidyne stator.

Referring now to Figures 1 and 2 which illustrate the first embodiment of our improved amplidyne system, we see that 11 represents the amplidyne armature which has a commutator connected to a conventional direct-current armature winding and is adapted to be driven at substantially constant speed by a suitable source of mechanical power. On stator 10 (Figure 2) is shown, by way of example, a two-pole excitation system having four polar segments.

With this type of excitation the armature is provided with two sets of brushes: i. e. primary brushes 13 and 14 and secondary brushes 23 and 24 which are displaced substantially 90 electrical degrees from the primary brushes. These two sets of brushes connect the armature windings into two armature circuits as follows:

(1) *Primary armature circuit.*—Primary brushes 13 and 14 are connected together by short-circuiting conductor 15, to provide a primary circuit through the armature 11. Due to this short-circuiting of the primary brushes, a very small amount of initial flux is required to induce a voltage that will build up a relatively large primary current which in turn produces a magnetic flux or primary armature reaction flux along the primary axis indicated by arrow 12.

(2) *Secondary armature circuit.*—Secondary brushes 23 and 24 also contact the commutator of armature 11, and are connected by conductors 25 and 26 through stator compensating field winding 41 (hereinafter described) to a load, such as the separate field exciting winding 27 of a generator G, to provide a secondary circuit through the armature 11. As the armature 11 rotates, the conductors of the armature winding that are connected to the secondary brushes 23 and 24 cut the primary armature reaction flux and a voltage is induced between these brushes to cause a secondary or load current to flow through the secondary circuit of the armature and produce a secondary armature reaction along the axis of these brushes, indicated by arrow 22 in Figure 1.

Turning now to the stator windings of the amplidyne, we see that there are five field exciting windings as follows:

(1) *Separate control field winding 31.*—In order to control the secondary or load characteristics of the amplidyne, a separate field exciting winding 31 is arranged to provide a component of magnetic flux or excitation that is along the axis of the secondary brushes 23 and 24, but is opposite in direction to the secondary armature reaction 22, as indicated by control flux arrow 32 in Figure 1. This control flux 32, provided by control winding 31, induces the voltage between brushes 13 and 14 that builds up the primary current in the armature primary circuit as above described. Suitable means, such as variable resistor 38, in series with winding 31, may be used to control the excitation of the winding. Since little induced voltage is required to produce a large armature primary current, the excitation of winding 31 may be small.

(2) *Compensating field winding 41.*—In order to increase the sensitivity of control flux 32, which is opposed by the secondary armature reaction flux 22, and to neutralize the magnetic coupling of electric current in the secondary armature circuit with the primary armature circuit, a compensating field winding 41 is provided which is arranged to provide a component of magnetic flux that is along the axis of the secondary brushes 23 and 24, and is opposite to and substantially neutralizes the secondary armature reaction flux 22, as indicated by compensating flux arrow 42 in Figure 1. This compensating flux is made proportional to the secondary or load current in the armature by connecting it in series with secondary brush 23 in the secondary armature circuit. Use of this compensating field further reduces the required control field excitation, and thereby allows a control field of less inductance, thus increasing speed of response and sensitivity of control.

(3) *Stabilizing fieldwinding 51.*—In order to neutralize the mutual coupling of electric current in the compensating field winding 41 with the control field winding 31, a stabilizing field winding 51 is arranged on the pole pieces to provide a component of magnetic flux, indicated by arrow 52 in Figure 1, that is along the axis of the secondary brushes 23 and 24 and is opposite to the flux component 42 of the compensating winding 41. This stabilizing winding 51 is connected into the secondary circuit so that current oscillations will have opposite effects in compensating winding 41 and stabilizing winding 51. One such connection is shown in Figure 1, where winding 51 is connected across the secondary 56 of a transformer having its primary connected across the secondary circuit of the amplidyne. When the amplidyne secondary voltage changes rapidly, a current is induced in the transformer secondary 56 and flows through the stabilizing field winding which opposes the change in amplidyne voltage by a flux component 52 which is proportional to the change of voltage across the secondary brushes 23 and 24, and thus prevents too rapid response of the amplidyne which would otherwise cause oscillation. By adjusting resistor 58 until oscillations cease, the maximum response of the amplidyne can be obtained.

(4) *Self-energized field winding 61.*—In order to increase the net flux on the amplidyne in proportion to the secondary voltage, a self-field winding 61 energized by amplidyne secondary voltage, by connecting it across the amplidyne secondary, is arranged to provide a component of magnetic flux, indicated by arrow 62 in Figure 1, that is along the axis of the secondary brushes 23 and 24 and in the same direction as the flux 32 of the control field winding 31. Thus, in effect, the self-field flux 62, when added to the control flux 32, "boosts" the control flux, and hence the amplidyne flux, giving an improved amplidyne voltage-flux characteristic. In the claims, self-field winding 61 is called a "shunt-connected winding."

(5) *Current field winding 71.*—G indicates symbolically the conventional main generator which has a stator (not shown) on which are wound separate field exciting winding 27 (in the generator primary circuit and amplidyne secondary or output circuit), commutating field winding 76 (in the generator secondary circuit), and series field winding 77 (in the generator secondary circuit). Generator G also has a rotor or armature (not shown) with conventional windings which are connected through commutator 111, secondary brushes 123 and 124, and windings 76 and 77 to a load in the form of a motor M likewise indicated symbolically in the drawings. The object of winding 76 is to eliminate distortion of flux due to commutation, and the object of winding 77 (the flux of which "bucks" the flux of winding 27) is to decrease automatically the main generator secondary voltage with increase in secondary current.

In order to achieve a further reduction of generator voltage that will prevent "overshooting," when the generator armature current increases with load, current field winding 71, connected across generator series field winding 77, is arranged about the poles of the amplidyne stator 10 to produce a component of magnetic flux 72 that is along the axis of secondary brushes 23 and 24, but is opposite in direction to the control field flux 32. The effect of the current field is thus to "buck" the amplidyne control field in proportion to the generator load current and decrease the amplidyne secondary voltage. The combination of self-field winding 61, with current field winding 71, greatly increases the efficiency of the current field winding, since as the current field flux 72 "bucks" the control field flux 32, thus decreasing amplidyne flux and amplidyne voltage, the decrease in amplidyne voltage automatically decreases the self-field flux 62 in proportion, which in turn results in further decrease in the amplidyne flux and voltage. Expressed in another way, the self-field flux increases the rate of change of amplidyne voltage with effective control field flux (32 plus 62) until it approaches the slope of the straight portion of the amplidyne load saturation curve, so that only a slight increase in current and flux in the current field winding 71 will result in a very fast decrease and even reversal of amplidyne voltage with a corresponding sharp drop in excitation flux of the main generator. Thus, with only a relatively small increase in generator current (proportional to load), we are able to obtain automatically an immediate sharp decrease in main generator voltage which will prevent harmful "overshooting."

Figure 3:
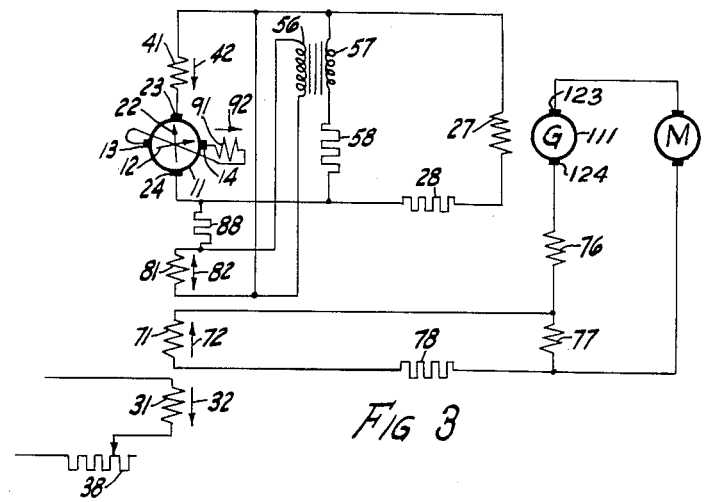
Figure 3 is an electrical diagram illustrating schematically an electrical system embodying the second embodiment of our invention.
Figure 4:
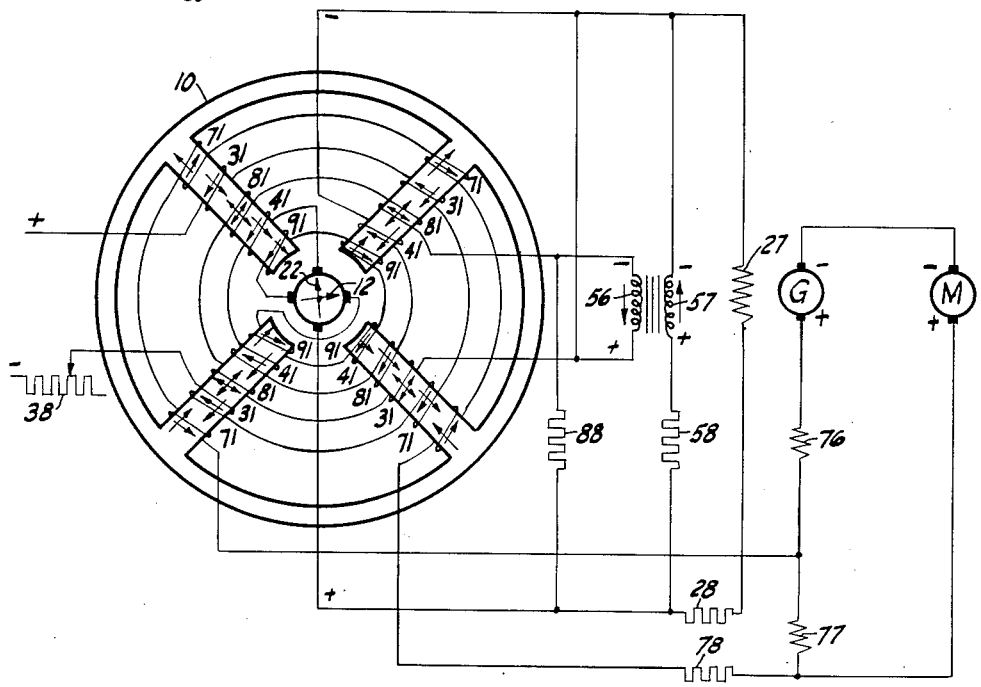
Figure 4 is a schematic diagram of the system shown in Figure 3, showing the arrangement of field excitation windings on the amplidyne stator.

Turning now to our second embodiment, as illustrated in Figures 3 and 4, we see that it differs from the first embodiment principally in two respects:

(1) *Combined self and stabilizing field wind-*

*ing 81.*—Since the stabilizing field functions only when there is a change of voltage in the amplidyne secondary circuit, the same winding may by appropriate additional connections also be used as a self field to boost the amplidyne flux and voltage. This is accomplished by connecting the combined self and stabilizing field winding 81 not only across the secondary 56 of the stabilizing transformer, thereby producing flux in winding 81 approximately proportional to change in voltage across the transformer primary 57, but also directly, through resistance 88, across the amplidyne secondary, thereby producing flux in winding 81 proportional to the amplidyne voltage itself. The winding 81 is arranged to provide a total flux component 82 that normally adds to the control flux 32, but may oppose it if amplidyne secondary voltage change is sufficient to overcome the self-field flux.

(2) *Primary excitation winding 91.*—In order to reduce heating due to large primary excitation current in the armature, the primary source of excitation may be transferred in part from the armature winding to a stator winding by adding a field exciting stator winding 91 which is connected in series with primary brushes, 13 and 14 and arranged to provide a component of magnetic flux that is in the same direction as the primary armature reaction flux 12, as indicated by the arrow 92. Thus primary armature current is reduced by the amount that would be required to produce the flux 92.

Having now described two embodiments of our invention, we wish it to be understood that our invention is not to be limited to the specific form or arrangement of parts herein described and shown.

We claim:

1. In a dynamoelectric machine, including a main generator and an amplidyne exciter therefor, the combination of: a stator for said amplidyne; a rotor for said amplidyne, having a commutator; a pair of substantially short-circuited primary brushes adapted to provide a primary circuit through said amplidyne rotor; a pair of secondary brushes electrically displaced from said primary brushes; a separate field winding for said main generator; a secondary circuit through said amplidyne rotor containing said secondary brushes and said separate field winding; an independently excited control field winding on said stator for controlling the secondary characteristics of said amplidyne and having when excited a component of excitation along substantially the same axis and in opposition to the armature reaction excitation of electric current in said secondary circuit; a compensating field winding on said stator having when excited a component of excitation responsive to electric current in said secondary circuit and along substantially the same axis and in opposition to said armature reaction excitation; and a shunt-connected winding on said stator connected in shunt relationship to said separate field winding and having whenever the control field winding is excited a component of excitation responsive to and substantially in phase with the voltage across said separate field winding and normally in substantially the same direction as the excitation component of the control field winding.

2. A dynamoelectric machine according to claim 1, further characterized by the fact that the shunt-connected winding component of excitation is responsive to both voltage and to change of voltage across said separate field winding.

3. In a dynamoelectric machine, including a main generator and an amplidyne excitor therefor, the combination of: a stator for said amplidyne; a rotor for said amplidyne, having a commutator; a pair of substantially short-circuited primary brushes adapted to provide a primary circuit through said rotor; a pair of secondary brushes electrically displaced from said primary brushes; a separate field winding for said main generator; a secondary circuit through said rotor containing said secondary brushes and said separate field winding; compensating means for substantially neutralizing magnetic coupling of electric current in said secondary circuit with said primary circuit; and a shunt-connected winding on said stator having when excited a component of excitation responsive to and substantially in phase with the output voltage of said amplidyne and along substantially the same axis and normally in opposition to the armature reaction excitation of electric current in said secondary circuit.

4. In a dynamoelectric machine, including a main generator and an amplidyne excitor therefor, the combination of: a stator for said amplidyne; a rotor for said amplidyne, having a commutator; a pair of substantially short-circuited primary brushes adapted to provide a primary circuit through said rotor; a pair of secondary brushes electrically displaced from said primary brushes; a separate field winding for said main generator; a secondary circuit through said rotor containing said secondary brushes and said separate field winding; compensating means for substantially neutralizing magnetic coupling of electric current in said secondary circuit with said primary circuit; and common means including an amplidyne secondary shunt-connected winding for providing a flux component responsive to both the output voltage of said amplidyne and to change in said output voltage.

LUTHER E. BLANCHETT.
CHARLES L. STEFFEN.

References Cited in the file of this patent

UNITED STATES PATENTS

| Number | Name | Date |
|---|---|---|
| 2,247,166 | Edwards et al. | June 24, 1941 |
| 2,334,179 | Edwards et al. | Nov. 16, 1943 |
| 2,352,619 | Garr | July 4, 1944 |
| 2,357,087 | Alexanderson | Aug. 29, 1944 |
| 2,419,462 | Petch | Apr. 22, 1947 |
| 2,445,788 | Litman | July 27, 1948 |